(12) United States Patent
Taniguchi et al.

(10) Patent No.: US 12,009,555 B2
(45) Date of Patent: Jun. 11, 2024

(54) RADICAL-CURABLE SEAL MEMBER FOR FUEL CELL

(71) Applicant: Sumitomo Riko Company Limited, Aichi (JP)

(72) Inventors: Shota Taniguchi, Aichi (JP); Yasunori Nimura, Aichi (JP); Kenji Yamamoto, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 569 days.

(21) Appl. No.: 17/344,918

(22) Filed: Jun. 10, 2021

(65) Prior Publication Data

US 2021/0313596 A1  Oct. 7, 2021

Related U.S. Application Data

(63) Continuation of application No. PCT/JP2020/031290, filed on Aug. 19, 2020.

(30) Foreign Application Priority Data

Aug. 28, 2019 (JP) ................. 2019-155491

(51) Int. Cl.
| | |
|---|---|
| H01M 8/0284 | (2016.01) |
| C08F 265/06 | (2006.01) |
| C08K 3/36 | (2006.01) |
| C08K 9/06 | (2006.01) |
| H01M 8/0276 | (2016.01) |
| H01M 8/1004 | (2016.01) |

(52) U.S. Cl.
CPC ......... *H01M 8/0284* (2013.01); *C08F 265/06* (2013.01); *C08K 3/36* (2013.01); *C08K 9/06* (2013.01); *H01M 8/0276* (2013.01); *H01M 8/1004* (2013.01)

(58) Field of Classification Search
CPC ............. H01M 8/0284; H01M 8/0276; H01M 8/1004; H01M 2008/1095; H01M 8/0282; H01M 8/10; C08F 265/06; C08F 290/046; C08F 290/04; C08K 3/36; C08K 9/06; C08K 5/103; Y02E 60/50; C09K 3/10
See application file for complete search history.

(56) References Cited

U.S. PATENT DOCUMENTS

| | | | |
|---|---|---|---|
| 2007/0160888 A1* | 7/2007 | Takahashi | C08J 5/2237 429/535 |
| 2009/0004541 A1* | 1/2009 | Jacobine | H01M 8/0284 264/494 |
| 2014/0342271 A1* | 11/2014 | Mittelsteadt | C25B 13/02 264/479 |
| 2015/0130318 A1* | 5/2015 | Kitada | C08L 63/00 523/466 |
| 2016/0222170 A1* | 8/2016 | Muto | C08G 65/336 |
| 2018/0319956 A1* | 11/2018 | DeCato | C09C 1/3081 |
| 2018/0346706 A1* | 12/2018 | Jin | C08K 5/101 |

FOREIGN PATENT DOCUMENTS

| | | |
|---|---|---|
| JP | 2000072816 | 3/2000 |
| JP | 2008150502 | 7/2008 |
| JP | 2011222312 | 11/2011 |
| JP | 2016065183 | 4/2016 |
| JP | 2016157635 | 9/2016 |
| JP | 2017082168 | 5/2017 |
| JP | 2017188417 | 10/2017 |
| JP | 2018138682 | 9/2018 |

OTHER PUBLICATIONS

"International Search Report (Form PCT/ISA/210) of PCT/JP2020/031290," dated Nov. 10, 2020, with English translation thereof, pp. 1-4.

* cited by examiner

*Primary Examiner* — Muhammad S Siddiquee
(74) *Attorney, Agent, or Firm* — JCIPRNET

(57) ABSTRACT

A radical-curable seal member for fuel cell 4 having a glass transition temperature of −40° C. or lower made from a crosslinked product of a radical-curable composition containing (A) (Meth)acrylic polymer having a (meth)acryloyl group at a molecular chain end, (B) Monofunctional (meth)acrylic monomer, (C) Polyfunctional (meth)acrylic monomer and (D) Radical polymerization initiator, wherein the radical-curable composition contains 20 to 90 weight parts of component (B), 1 to 10 weight parts of component (C), 0.01 to 10 weight parts of component (D) with respect to 100 weight parts of component (A), a weight ratio [(B)/(C)] of the component (B) with respect to the component (C) being 4 to 24, and a content [(C)/{(A)+(B)+(C)}] of the component (C) with respect to a total of 100 wt % of the component (A), the component (B), and the component (C) being 1 to 7 wt %.

13 Claims, 1 Drawing Sheet

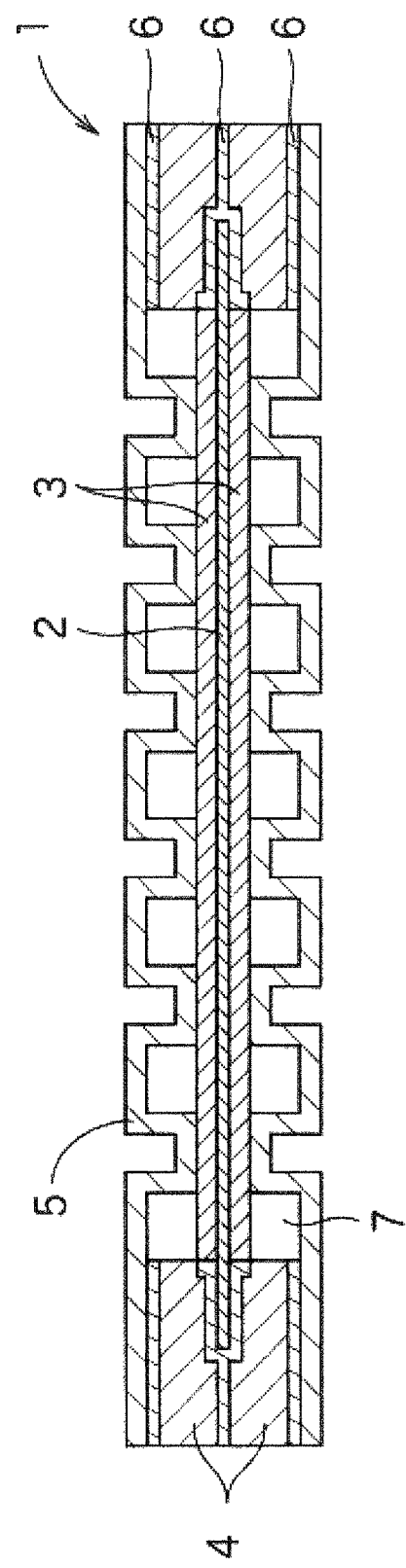

RADICAL-CURABLE SEAL MEMBER FOR FUEL CELL

CROSS-REFERENCE TO RELATED APPLICATIONS

This application is a continuation application of International Application number PCT/JP2020/031290 on Aug. 19, 2020, which claims the priority benefit of Japan Patent Application No. 2019-155491, filed on Aug. 28, 2019. The entirety of each of the above-mentioned patent applications is hereby incorporated by reference herein and made a part of this specification.

BACKGROUND

Technical Field

The present disclosure relates to a radical-curable seal member used for sealing a component of a fuel cell.

Related Art

Various seal members are used as a member constituting a fuel cell. For example, in a polymer electrolyte fuel cell for automobiles, in order to prevent leakage of gas and refrigerant and to keep the inside of the cell in a wet state, a seal member is used which secures sealability in the periphery of a membrane electrode assembly (MEA) and a porous layer and between separators. This seal member is required to have excellent warp resistance (compression permanent strain resistance) in order to secure long-term reliability as well as various mechanical properties.

In response to this request, the applicant has proposed a seal member made from a crosslinked product which is obtained by blending an organic peroxide, potassium fatty acid, and the like with ethylene-propylene-diene rubber (EPDM) (Patent literature 1).

LITERATURE OF RELATED ART

Patent Literature

[Patent literature 1] Japanese Patent Laid-Open No. 2017-188417

Because the seal member described in Patent literature 1 is molded by filling a composition containing EPDM into a mold of an injection molding device and vulcanizing the composition, a considerable amount of time is taken for the filling step and the vulcanization step. In addition, because a large amount of initial investment cost and maintenance cost related to manufacturing equipment are required, there is room for improvement in terms of further improving productivity.

In addition, because this seal member contains EPDM having a high viscosity property as a main component, there is a limit to reduction in viscosity, but there is room for improvement in terms of miniaturization of a fuel cell or the like by making the seal member into a thin film.

In addition, with the spread of fuel cells in recent years, use of fuel cells in an extremely low temperature environment is also expected, and thus sealability is required to be ensured within a wide temperature range.

The present disclosure is completed in view of the above situations, and provides a radical-curable seal member for fuel cell that has excellent productivity, can be made into a thin film, and has excellent sealability within a wide temperature range.

SUMMARY

As a result of diligent studies to achieve the above object, the inventors have surprisingly found that, by using a crosslinked product made from a composition obtained by blending, at a predetermined ratio, a (meth)acrylic polymer having a (meth)acryloyl group at a molecular chain end, a monofunctional (meth)acrylic monomer, a polyfunctional (meth)acrylic monomer, and a radical polymerization initiator, a radical-curable seal member for fuel cell can be provided which has excellent productivity and can be made into a thin film, and a radical-curable seal member for fuel cell can be provide which has excellent compression permanent strain resistance and compression cracking property within a wide temperature range.

That is, the gist of the present disclosure is the following [1] to [13].

[1] A radical-curable seal member for fuel cell, comprising a crosslinked product of a radical-curable composition and having a glass transition temperature (Tg) of −40° C. or lower, wherein the radical-curable composition contains the following components (A) to (D) in a manner of containing 20 to 90 weight parts of the component (B), 1 to 10 weight parts of the component (C), and 0.01 to 10 weight parts of the component (D) with respect to 100 weight parts of the component (A), a weight ratio [(B)/(C)] of the component (B) with respect to the component (C) being 4 to 24, and a content [(C)/{(A)+(B)+(C)}] of the component (C) with respect to a total of 100 wt % of the component (A), the component (B), and the component (C) being 1 to 7 wt %.

(A) (Meth)acrylic polymer having a (meth)acryloyl group at a molecular chain end.
(B) Monofunctional (meth)acrylic monomer.
(C) Polyfunctional (meth)acrylic monomer.
(D) Radical polymerization initiator.

[2] The radical-curable seal member for fuel cell according to [1], wherein a glass transition temperature (Tg) of the component (B) is −40° C. or lower.

[3] The radical-curable seal member for fuel cell according to [1] or [2], wherein the component (B) is at least one selected from a group consisting of 2-ethylhexyl acrylate, n-butyl acrylate, nonyl acrylate, isodecyl acrylate, and n-octyl acrylate.

[4] The radical-curable seal member for fuel cell according to any one of [1] to [3], wherein a number average molecular weight (Mn) of the component (A) is 5,000 to 100,000.

[5] The radical-curable seal member for fuel cell according to any one of [1] to [4], wherein the component (A) is a copolymer composed of an acrylic acid ester monomer having an ester group having 2 to 14 carbon atoms, or a copolymer composed of a methacrylic acid ester monomer having an ester group having 8 to 14 carbon atoms.

[6] The radical-curable seal member for fuel cell according to any one of [1] to [5], wherein the component (A) is a copolymer composed of n-butyl acrylate and 2-ethylhexyl acrylate.

[7] The radical-curable seal member for fuel cell according to claim 6, wherein a copolymerization ratio of the copolymer (n-butyl acrylate:2-ethylhexyl acrylate) is 40 to 60:60 to 40.

[8] The radical-curable seal member for fuel cell according to any one of [1] to [7], wherein the component (C) is at least one selected from a group consisting of 1,6-hexanediol di(meth)acrylate, 1,9-nonanediol di(meth)acrylate and pentaerythritol acrylate-based compounds.

[9] The radical-curable seal member for fuel cell according to any one of [1] to [8], further containing silica.

[10] The radical-curable seal member for fuel cell according to [9], wherein the silica is at least one selected from a group consisting of dimethylsilylated silica, trimethylsilylated silica, octylsilylated silica, and methacrylsilylated silica.

[11] The radical-curable seal member for fuel cell according to any one of [1] to [10], wherein the radical-curable composition is an ultraviolet curable composition.

[12] The radical-curable seal member for fuel cell according to any one of [1] to [11], wherein the radical-curable seal member for fuel cell is a film-like seal member.

[13] The radical-curable seal member for fuel cell according to [12], wherein a thickness of the film-like seal member is 50 to 1,000 μm.

BRIEF DESCRIPTION OF THE DRAWINGS

FIG. 1 is a cross-sectional view showing an example in which a radical-curable seal member for fuel cell of the present disclosure is used as a seal body.

DESCRIPTION OF THE EMBODIMENTS

According to the present disclosure, the radical-curable seal member for fuel cell can be provided which has good productivity, can be made into a thin film, and has excellent compression permanent strain resistance and compression cracking property within a wide temperature range.

Hereinafter, an embodiment of the present disclosure is described in detail. However, the present disclosure is not limited to this embodiment. Moreover, in the specification, "(meth)acrylic" is a term used as a concept including both acrylic and methacrylic, "(meth)acrylate" is used as a concept including both acrylate and methacrylate, "(meth)acryloyl group" is a term used as a concept including both an acryloyl group and a methacryloyl group. In addition, "polymer" is a term used as a concept including copolymers and oligomers.

The radical-curable seal member for fuel cell of the present disclosure (hereinafter, may be simply referred to as the "seal member") is made from a crosslinked product of a radical-curable composition containing the following components (A) to (D) in a predetermined blending ratio, and if necessary, the radical-curable composition further contains components (E) and (F) and other components.

(A) (Meth)acrylic polymer having a (meth)acryloyl group at a molecular chain end.
(B) Monofunctional (meth)acrylic monomer.
(C) Polyfunctional (meth)acrylic monomer.
(D) Radical polymerization initiator.
(E) Filler.
(F) Anti-aging agent.

<Component (A)>

The component (A) is a (meth)acrylic polymer having a (meth)acryloyl group at a molecular chain end. The component (A) is a main component of the radical-curable composition used in the present disclosure, and usually accounts for the majority of the entire composition.

A molecular chain (main chain) of the component (A) is constituted by a homopolymer or a copolymer of one or more (meth)acrylic monomers, or a copolymer of one or more (meth)acrylic monomers and a vinyl-based monomer copolymerizable with the one or more (meth)acrylic monomers.

The (meth)acrylic monomer may be, for example, (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, butyl (meth)acrylate, n-pentyl (meth)acrylate, isoamyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, oleyl (meth)acrylate, behenyl (meth)acrylate, 2-decyl tetradecanyl (meth)acrylate, phenyl (meth)acrylate, toluyl (meth)acrylate, tolyl (meth)acrylate, 4-t-butyl cyclohexyl (meth)acrylate, dicyclopentenyl (meth)acrylate, dicyclopentenyl oxyethyl (meth)acrylate, dicyclopentanyl (meth)acrylate, dicyclopentanyl oxyethyl (meth)acrylate, isobornyl (meth)acrylate, or the like. These may be used alone, or a plurality thereof may be copolymerized.

In addition, the (meth)acrylic monomer may be copolymerized or block copolymerized with another monomer. The monomer to be copolymerized may be, for example: a styrene-based monomer such as styrene or the like; a fluorine-containing vinyl monomer such as perfluoroethylene or the like; a silicon-containing vinyl-based monomer such as vinyltrimethoxysilane or the like; a nitrile group-containing vinyl-based monomer such as acrylonitrile, methacrylonitrile, or the like; an amide group-containing vinyl-based monomer such as acrylamide, methacrylicamide, or the like; or other monomers.

Among the above, an (meth)acrylic acid ester monomer such as ethyl (meth)acrylate, n-butyl (meth)acrylate, 2-ethylhexyl (meth)acrylate, stearyl (meth)acrylate, or the like is preferable, and an acrylic acid ester monomer having 2 to 14 carbon atoms in the ester group and an methacrylic acid ester monomer having 8 to 14 carbon atoms in the ester group are more preferable. If the number of the carbon atoms in the ester group is out of the above range, the compression permanent strain resistance has a tendency to be inferior at low temperature. In addition, particularly, if the number of the carbon atoms is greater than the above range, reactivity during polymerization tends to deteriorate, which makes synthesization difficult.

The component (A) is preferably a copolymer of a (meth)acrylic acid ester monomer having a (meth)acryloyl group at the molecular chain end, and is more preferably, for example, a copolymer which is obtained by radical polymerization of a (meth)acrylic acid ester monomer such as ethyl (meth)acrylate, n-butyl (meth)acrylate, 2-ethylhexyl (meth)acrylate, stearyl (meth)acrylate, or the like. Of these, a copolymer obtained by polymerizing n-butyl (meth)acrylate and 2-ethylhexyl (meth)acrylate is particularly more preferable.

A copolymerization ratio (weight ratio) of the copolymer of the (meth)acrylic acid ester monomer is, for example, in the case of the copolymer obtained by polymerizing n-butyl (meth)acrylate and 2-ethylhexyl (meth)acrylate (n-butyl acrylate: 2-ethylhexyl acrylate), preferably 40 to 60:60 to 40 from the viewpoint of more effectively exerting the effects of the present disclosure.

The component (A) is a (meth)acrylic polymer having a (meth)acryloyl group at least at one end of the molecular chain, but from the viewpoint of more effectively exerting the effects of the present disclosure, a (meth)acrylic polymer having a (meth)acryloyl group at both ends of the molecular chain is preferable.

The component (A) is preferably a compound represented by the following general formula (1) from the viewpoint of more effectively exerting the effects of the present disclosure.

[Chemical 1]

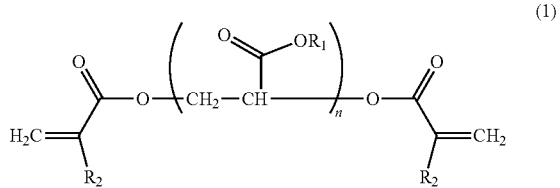

(1)

(Here, in the general formula (1), $R_1$ is a hydrogen atom or an ester residue having 1 to 20 carbon atoms, $R_2$ is a hydrogen atom or an organic group having 1 to 20 carbon atoms, and n is an integer of 20 to 800.)

In the above general formula (1), the ester residue having 1 to 20 carbon atoms may be linear, branched or cyclic, for example, a methyl ester residue, an ethyl ester residue, an n-propyl ester residue, an isopropyl ester residue, a n-butyl ester residue, an isobutyl ester residue, a t-butyl ester residue, a pentyl ester residue, a hexyl ester residue, a heptyl ester residue, an octyl ester residue, a cyclopentyl ester residue, a cyclohexyl ester residue, or the like. Of these, as the ester residue, an ester residue having 2 to 14 carbon atoms is preferable. In addition, in the general formula (1), the organic group may be an unsubstituted or substituted monovalent hydrocarbon group having 1 to 20 carbon atoms or the like, such as an alkyl group having 1 to 20 carbon atoms, an alkenyl group having 2 to 20 carbon atoms, an aryl group having 6 to 20 carbon atoms, an aralkyl group having 7 to 20 carbon atoms, or the like. As the organic group, a hydrogen atom or an alkyl group is preferable from the viewpoint of enhancing reactivity, and of these, a hydrogen atom or a methyl group is more preferable. In addition, in the general formula (1), n is 20 to 800, and of these, 50 to 400 is preferable.

These components (A) may be used alone, or two or more thereof may be used in combination.

A glass transition temperature (Tg) of the component (A) is not particularly limited, but is, for example, preferably −40° C. or lower, and more preferably −50° C. or lower. If the glass transition temperature (Tg) of the component (A) is higher than the above temperature, the compression permanent strain resistance at a low temperature tends to be inferior. Moreover, lower limit is not particularly limited, and is, for example, −100° C.

The glass transition temperature (Tg) of the component (A) is measured by a differential scanning calorimeter (DSC). Specifically, a differential thermal analysis device (DSC) SSC-5200 manufactured by Seiko Instruments Inc. is used. After preliminary adjustment in which a temperature of the sample is once raised to 200° C. at a rate of 25° C./min and then held for 10 minutes and is lowered to 50° C. at a rate of 25° C./min, measurement is performed in a process, in which the temperature was raised to 200° C. at the rate of 10° C./min, an integrated value is obtained from an obtained DSC curve, and the glass transition temperature is obtained from a maximum point thereof.

A number average molecular weight (Mn) of the component (A) is, for example, 5,000 to 100,000, and more preferably 10,000 to 50,000. When the number average molecular weight (Mn) is smaller than the above range, the compression cracking property tends to be inferior. When the number average molecular weight (Mn) is larger than the above range, the compression permanent strain resistance tends to be inferior, and high viscosity property tends to occur, resulting in lower handling performance.

From the viewpoint of more effectively exerting the effects of the present disclosure, a molecular weight distribution (weight average molecular weight (Mw)/number average molecular weight (Mn)) of the component (A) is preferably 1.1 to 1.6, and more preferably 1.1 to 1.4. Moreover, the number average molecular weight (Mn) and the weight average molecular weight (Mw) are measured by gel permeation chromatography (GPC). Specifically, chloroform is used as a mobile phase, the measurement is performed on a polystyrene gel column, and the number average molecular weight and the like can be obtained in terms of polystyrene.

From the viewpoint of more effectively exerting the effects of the present disclosure, viscosity of the component (A) at 23° C. is preferably 40 to 1,000 Pas, and more preferably 100 to 800 Pas.

As a method for synthesizing the component (A), a known synthesis method can be used, for example, synthesizing the component (A) by radical polymerization of the (meth) acrylate monomer can be used. Of these, living radical polymerization and atom transfer radical polymerization are preferable.

In addition, the component (A) is also available as a commercially available product, and examples thereof include RC-100C, RC-200C, (all manufactured by Kaneka Corporation) and the like.

<Component (B)>

The monofunctional (meth)acrylic monomer as the component (B) is a (meth)acrylate compound having one (meth) acryloyl group in the molecular structure. Specific examples thereof include known ethylenically unsaturated monofunctional monomers, for example, a (meth)acrylic monomer used as the monomers constituting the main chain of the (A). Of these, from the viewpoint of further enhancing the effects of the present disclosure, acrylic acid alkyl ester monomers such as methyl (meth)acrylate, ethyl (meth)acrylate, n-propyl (meth)acrylate, n-butyl (meth)acrylate, isobutyl (meth)acrylate, butyl (meth)acrylate, n-pentyl (meth)acrylate, n-heptyl (meth)acrylate, 2-ethylhexyl (meth)acrylate, n-octyl (meth)acrylate, isooctyl (meth)acrylate, nonyl (meth) acrylate, isononyl (meth)acrylate, decyl (meth)acrylate, isodecyl acrylate, lauryl (meth)acrylate, tridecyl (meth) acrylate, stearyl (meth)acrylate, and the like are preferable. Of these, n-butyl acrylate, n-octyl acrylate, 2-ethylhexyl acrylate, nonyl acrylate, and isodecyl acrylate are more preferable.

These components (B) may be used alone, or two or more thereof may be used in combination.

A content of the component (B) is 20 to 90 weight parts with respect to 100 weight parts of the component (A), and is preferably 25 to 60 weight parts from the viewpoint of further enhancing the effects of the present disclosure.

A glass transition temperature (Tg) of the component (B) is not particularly limited, but is preferably −40° C. or lower, and more preferably −50° C. or lower. When the glass transition temperature (Tg) of the component (B) is higher than the above temperature, the compression permanent strain resistance at a low temperature tends to be inferior. Moreover, the lower limit is not particularly limited, and is, for example, −100° C. The glass transition temperature (Tg) of the component (B) is measured by differential scanning calorimeter (DSC) similarly as above for a homopolymer of the monofunctional (meth)acrylic monomer as the component (B).

<Component (C)>

The polyfunctional (meth)acrylic monomer as the component (C) is a (meth)acrylate compound having two or more (meth)acryloyl groups in the molecular structure. Specific examples thereof include known ethylenically unsaturated polyfunctional monomers. The (meth)acrylic monomer having two (meth)acryloyl groups in the molecular structure may be, for example: alkanediol di(meth) acrylate such as 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 3-methyl-1,5-pentanediol di(meth)acrylate, 2,4-diethyl-1,5-pentanediol di(meth)acrylate, butyl ethyl propanediol di(meth)acrylate, 3-methyl-1,7-octanediol di(meth)acrylate, 2-methyl-1,8-octanediol di(meth)acrylate, neopentyl glycol di(meth)acrylate; ethoxylated cyclohexane dimethanol di(meth)acrylate, ethoxylated bisphenol A di(meth)acrylate, tricyclodecane dimethanoldi(meth)acrylate, propoxylated ethoxylated bisphenol A di(meth)acrylate, 1,1,1-trishydroxymethylethane di(meth)acrylate; or the like.

A (meth)acrylic monomer having three or more (meth) acryloyl groups may be, for example, a pentaerythritol acrylate-based compound or the like having a pentaerythritol structure and a (meth)acrylate structure such as methylolmethylolpropane tri(meth)acrylate, trimethylolpropaneethoxy tri(meth)acrylate, trimethylolpropanepropoxy tri(meth)acrylate, glycerin propoxytri(meth)acrylate, tetramethylolmethane tri(meth)acrylate, tetramethylol methanetetra(meth) acrylate, ditrimethylol propanetetra(meth)acrylate, monopentaerythritol (meth)acrylate, dipentaerythritol (meth)acrylate, tripentaerythritol (meth)acrylate, polypentaerythritol (meth)acrylate, or the like.

Among these components (C), from the viewpoint of further enhancing the effects of the present disclosure, alkanediol di(meth)acrylate such as 1,6-hexanediol di(meth) acrylate, 1,8-octanediol di(meth)acrylate, 1,9-nonanediol di(meth)acrylate, 1,10-decanediol di(meth)acrylate, 1,12-dodecanediol di(meth)acrylate, 3-methyl-1,5-pentanediol di(meth)acrylate, 2,4-diethyl-1,5-pentanediol di(meth)acrylate, butyl ethylpropanediol di(meth)acrylate, 3-methyl-1,7-octanediol di(meth)acrylate, 2-methyl-1,8-octanediol di(meth)acrylate, neopentyl glycol di(meth)acrylate, and pentaerythritol acrylate-based compounds are preferable. Of these, 1,6-hexanediol di(meth)acrylate, 1,9-nonanediol di(meth)acrylate, and pentaerythritol acrylate-based compounds are more preferable.

The number of carbon atoms in the molecular chain (main chain) of the polyfunctional (meth)acrylic monomer of the component (C) is preferably 6 or more. When the number of carbon atoms is less than the above value, the compression cracking property tends to be inferior.

These components (C) may be used alone, or two or more thereof may be used in combination. For example, as the pentaerythritol acrylate-based compound, a mixture of tri pentaerythritol acrylate, dipentaerythritol acrylate, monopentaerythritol acrylate, and polypentaerythritol acrylate may be used.

A content of the component (C) is 1 to 10 weight parts with respect to 100 weight parts of the component (A), and is preferably 2 to 7.5 weight parts from the viewpoint of further enhancing the effects of the present disclosure.

A weight ratio [(B)/(C)] of the component (B) with respect to the component (C) is 4 to 24, and of these, 6 to 15 is preferable. When the weight ratio is smaller than the above range, the compression cracking property tends to be inferior, and when the weight ratio is larger than the above range, the compression permanent strain resistance tends to be inferior.

A content [(C)/{(A)+(B)+(C)}] of the component (C) with respect to a total of 100 wt % of the component (A), the component (B), and the component (C) is 1 to 7 wt %, and of these, 1.5 to 4 wt % is preferable. When the content of the component (C) is larger than the above range, the compression cracking property tends to be inferior.

<Component (D)>

A radical polymerization initiator of the component (D) is not particularly limited as long as the radical polymerization initiator is a compound that generates radicals by irradiating with energy rays, and may be, for example: a benzophenone-type compound such as benzophenone, 4-methylbenzophenone, 2,4,6-trimethylbenzophenone, methyl orthobenzoylbenzoate, 4-phenyl benzophenone, or the like; an anthraquinone-type compound such as t-butyl anthraquinone, 2-ethylanthraquinone, or the like; an alkyl phenone-type compound such as 2-hydroxy-2-methyl-1-phenyl propane-1-one, oligo {2-hydroxy-2-methyl-1-[4-(1-methylvinyl)phenyl]propanone}, benzyldimethylketal, 1-hydroxycyclohexyl phenylketone, benzoin methylether, 2-methyl-[4-(methylthio)phenyl]-2-morpholino-1-propanone, 2-hydroxy-1-{4-[4-(2-hydroxy-2-methypropionyebenzyl]phenyl}-2-methylpropane-1-one, or the like; a thioxanthone-type compound such as 2-benzyl-2-dimethylamino-1-(4-morpholinophenyl)-butanone-1, diethylthioxanthone, isopropylthioxanthone, or the like; an acylphosphine oxide-type compound such as 2,4,6-trimethylbenzoyldiphenyl phosphine oxide, bis(2,6-dimethoxybenzoyl)-2,4,4-trimethylpentyl phosphine oxide, bis(2,4,6-trimethylbenzoyl)-phenyl phosphine oxide, or the like; a phenylglyoxylate-type compound such as phenyl glyoxylic acid methylester, or the like; or other compounds. Of these, from the viewpoint of excellent reactivity, the alkyl phenone-type compound is preferable, and specifically, 2-hydroxy-2-methyl-1-phenyl propane-1-one and the like are more preferable.

These components (D) may be used alone, or two or more thereof may be used in combination.

A content of the component (D) is 0.01 to 10 weight parts with respect to 100 weight parts of the component (A), and of these, 0.1 to 10 weight parts is preferable.

<Component (E)>

A filler as the component (E) is not particularly limited, and may be silica, carbon black, calcium carbonate, titanium oxide, talc, clay, glass balloon or the like, and of these, silica is preferable because of excellent reinforcing properties. In addition, from the viewpoint of improving dispersibility, silica hydrophobized with a surface treatment agent is more preferable. As the silica hydrophobized with the surface treatment agent, for example, silica surface-treated with a silane compound is preferable, dimethylsilylated silica surface-treated with dimethylsilane, trimethylsilylated silica surface-treated with trimethylsilane, octylsilylated silica surface-treated with octylsilane, and methacryl silylated silica surface-treated with methacrylsilane are more preferable, and of these, trimethyl silylated silica and methacryl silylated silica are particularly more preferable.

A commercially available product of the component (E) may be, for example, "AEROSIL RX200" (manufactured by AEROSIL) which is trimethylsilylated silica, "AEROSIL R7200" (manufactured by AEROSIL) which is methacryl silylated silica, or the like.

These components (E) may be used alone, or two or more thereof may be used in combination.

When the component (E) is contained, a content thereof is not particularly limited, and is usually 1 to 30 weight parts with respect to 100 weight parts of the component (A). When the content of the component (E) is larger than the above range, high viscosity property tends to occur, resulting in poor handling performance.

<Component (F)>

An anti-aging agent of the component (F) is not particularly limited, and may be for example: an amine-based anti-aging agent such as N-phenyl-1-naphthylamine, N,N'-diphenyl-p-phenylenediamine, N,N'-di-2-naphthyl-p-phenylenediamine, N-phenyl-N'-isopropyl-p-phenylenediamine, di(4-octylphenyl)amine, 4,4'-bis($\alpha,\alpha$-dimethylbenzyl)diphenyl amine, p-(p-toluenesulfonylamide)diphenyl amine, N-phenyl-N'-(1,3-dimethylbutyl)-p-phenylenediamine, or the like; a phenol-based anti-aging agent such as 2,6-di-t-butyl-4-methylphenol, 2,6-di-t-butyl-4-ethylphenol, 2,6-di-t-butyl phenol, 2,4,6-tri-t-butyl phenol, styrenated phenol, 2,2'-methylenebis(4-methyl-6-t-butyl phenol), 2,2'-methylenebis(4-ethyl-6-t-butyl phenol), 4,4'-thiobis(3-methyl-6-t-butyl phenol), 4,4'-butylidenebis(3-methyl-6-t-butyl phenol), 4,4'-methylenebis(2,6-t-butyl phenol), 4,4'-isopropylidenebis(2,6-di-t-butyl phenol), 2,2'-isobutylidenebis(4,6-dimethylphenol), or the like; an imidazole-based anti-aging agent such as 2-mercaptobenzimidazole, 2-mercaptobenzimidazole zinc salt, 2-mercaptomethylbenziimidazole, or the like; a sulfur-based anti-aging agent such as dilaurylthiodipropionate, distearylthiodipropionate, or the like; or other agents. Of these, the amine-based anti-aging agent and the phenol-based anti-aging agent are preferable, and 4,4'-bis($\alpha,\alpha$-dimethylbenzyl)diphenyl amine is more preferable.

These components (F) may be used alone, or two or more thereof may be used in combination.

When the component (F) is contained, a content thereof is not particularly limited, and is usually 0.1 to 10 weight parts with respect to 100 weight parts of the component (A), and is preferably 0.5 to 5 weight parts.

<Various Additives>

In addition to the above components (A) to (F), the radical-curable composition of the present disclosure may be blended with, in a range where the effects of the present disclosure are not impaired, various additives such as compatibilizer, curability adjusting agent, lubricant, pigment, antifoaming agent, foaming agent, light stabilizer, surface modifier, and the like.

<Method for Producing Radical-Curable Composition>

The radical-curable composition used in the present disclosure is produced by a known method. For example, the radical-curable composition is produced by adding the component (A) to a mixture which is obtained by blending and stirring the component (B), the component (C), the component (D), the various additives, and the like, and mixing the component (A) and the mixture by using a mixer. When silica or the like is blended to make the component (E), for example, the radical-curable composition is produced by adding the component (A), in which the component (E) is dispersed, in the mixture which is obtained by blending and stirring the component (B), the component (C), the component (D), the various additives, and the like, and mixing the component (A) and the mixture using a mixer.

<Curing Method>

The radical-curable composition used in the present disclosure is not particularly limited, and is cured by an active energy ray such as an electron beam, an ultraviolet ray, or the like. Of these, the ultraviolet ray that causes less damage to a base material is preferable. An active energy source is not particularly limited, and a known one can be used. For example, a high-pressure mercury lamp, a black light, an LED, a fluorescent lamp, or the like can be used.

A glass transition temperature (Tg) of the radical-curable seal member for fuel cell made from a crosslinked product of the radical-curable composition of the present disclosure is −40° C. or lower. From the viewpoint of further enhancing the effects of the present disclosure, −45° C. or lower is more preferable. Moreover, the lower limit is not particularly limited, and is, for example, −100° C. The glass transition temperature (Tg) is measured by a differential scanning calorimeter (DSC) in the same manner as described above.

<Sealing Method>

A method for sealing the radical-curable composition used in the present disclosure is not particularly limited, and for example, the radical-curable composition may be coated to a component of a fuel cell and cured by irradiating the radical-curable composition with the active energy ray. A coating method is not particularly limited, and for example, various methods such as a dispenser, a spray, an inkjet, a screen printing, and the like can be used. More specifically, a sealing method such as foam-in-place gasket (FIPG), cure-in-place gasket (CIPG), and mold-in-place gasket (MIPG), or the like can be used.

In the present disclosure, the radical-curable composition containing the components (A) to (D) is sealed to the component of the fuel cell by using the above-mentioned sealing method, and thereby can be crosslinked in a short time (for example, about several tens of seconds), and productivity is excellent. In addition, the seal member of the present disclosure can be easily made into a film-like seal member, and the fuel cell can be miniaturized by making the seal member into a thin film. Specifically, for example, a thickness of the film-like seal member can be easily set to 50 to 1,000 μm, and the fuel cell can be miniaturized. Furthermore, the seal member of the present disclosure can provide a radical-curable seal member for fuel cell which has excellent compression permanent strain resistance and compression cracking property within a wide temperature range.

<Application>

The seal member of the present disclosure is used as a component of a fuel cell. Particularly, the seal member of the present disclosure is suitably used for fuel cells that require sealability within a wide temperature range, such as in cold regions.

<Production of Radical-Curable Seal Member for Fuel Cell>

The radical-curable seal member for fuel cell of the present disclosure can be produced in a manner that, after the composition containing the components (A) to (D) and, if necessary, the components (E) and (F), and the like is prepared, the composition is coated to various components of the fuel cell such as the separator by using a dispenser or the like, and is cured by being irradiated with the active energy ray.

In addition, the radical-curable seal member for fuel cell of the present disclosure can also be produced in a manner that the above composition is coated to a surface of various components of the fuel cell, which is coated with an adhesive, and is cured by being irradiated with the active energy ray.

Furthermore, the radical-curable seal member for fuel cell of the present disclosure can also be molded into a predetermined shape according to a shape of a seal target portion of the various components of the fuel cell. For example, when the radical-curable seal member for fuel cell of the present disclosure is formed into a film shape, the seal member can be attached to the various components of the fuel cell with an adhesive for use.

The components for the fuel cell sealed by the seal member of the present disclosure vary depending on a type, a structure, and the like of the fuel cell, and may be, for example, a separator (metal separator, carbon separator, or the like), a gas diffusion layer, an MEA (electrolyte membrane and electrode), and the like.

An example of the seal member of the present disclosure is shown in FIG. 1. FIG. 1 mainly shows a single cell 1 in a fuel cell formed by laminating a plurality of cells, and the cell 1 includes a MEA 2, a gas diffusion layer 3, a seal member 4, a separator 5, and an adhesion layer 6.

The seal member of the present disclosure may be formed in a manner that, for example: the separator 5 and the seal member 4 are adhered to each other via the adhesion layer 6; the separator 5 and the self-adhesive seal member 4 are adhered to each other; the MEA 2 and the seal member 4 are adhered to each other via the adhesion layer 6; the adjacent seal members 4 are adhered to each other via the adhesion layer 6; or other manners.

Although not shown, the MEA 2 consists of an electrolyte membrane and a pair of electrodes arranged on both sides in a stacking direction with the electrolyte membrane clamped in between. The electrolyte membrane and the pair of electrodes have a rectangular thin plate shape. The gas diffusion layers 3 are arranged on both sides in the stacking direction with the MEA 2 clamped in between. The gas diffusion layer 3 is a porous layer and has a rectangular thin plate shape.

The separator 5 is preferably a carbon separator or a metal separator, and from the viewpoint of conduction reliability, a metal separator having a carbon thin film such as a diamond-like carbon film (DLC film), a graphite film, or the like is particularly preferable. The separator 5 has a rectangular thin plate shape, and a total of six grooves extending in a longitudinal direction are recessed. A cross section of the separator 5 has an uneven shape due to these grooves. The separator 5 is arranged so as to face both sides of the gas diffusion layer 3 in the stacking direction. A gas flow path 7 for supplying gas to the electrodes is partitioned between the gas diffusion layer 3 and the separator 5 by utilizing the uneven shape.

The seal member 4 has a rectangular frame shape. Besides, the seal member 4 is adhered to the peripheral edge portions of the MEA 2 and the gas diffusion layer 3 and the separator 5 via the adhesion layer 6 to seal the peripheral edge portions of the MEA 2 and the gas diffusion layer 3. Moreover, in the example of FIG. 1, with respect to the seal member 4, two members that are separated into upper and lower parts are used, but a single seal member that combines the two members may also be used.

As a material for forming the adhesion layer 6, for example, rubber glue, a rubber composition which has a liquid shape at room temperature (23° C.), a primer, or the like is used. A method for coating the above material may be dispenser coating or the like, and usually, the material may be coated under normal temperature conditions. A thickness of the adhesion layer in the fuel cell seal body is usually 0.01 to 0.5 mm when the above liquid rubber composition is used.

When the fuel cell such as a polymer electrolyte fuel cell or the like is operated, a fuel gas and an oxidant gas are each supplied through the gas flow path 7. Here, the peripheral edge portion of the MEA 2 is sealed by the seal member 4 via the adhesion layer 6. Therefore, gas mixing and leakage do not occur.

EXAMPLES

Hereinafter, examples are described together with comparative examples. However, the present disclosure is not limited to these examples as long as the gist of the present disclosure is not exceeded.

First, materials shown below were prepared prior to the examples and the comparative examples.

<Component (A)>

Acryloyl group-terminated polyacrylate A1 (Synthetic example)

According to a known method (for example, described in Japanese Patent Laid-Open No. 2012-21216), cuprous bromide was used as a catalyst, pentamethyldiethylenetriamine was used as a ligand, and diethyl-2,5-dibromoadipate was used as a radical polymerization initiator. With respect to the acrylic monomer, 50 weight parts/50 weight parts of 2-ethylhexyl acrylate/n-butyl acrylate was used, the acrylic monomer/radical polymerization initiator ratio (molar ratio) was set to 180 for polymerization, and terminal bromine-based 2-ethylhexyl acrylate/n-butyl acrylate copolymer was obtained. The copolymer was dissolved in N, N-dimethylacetamide, potassium acrylate was added, and the mixture was heated and stirred at 70° C. under a nitrogen atmosphere. After N, N-dimethylacetamide in this mixed solution was distilled off under reduced pressure, butyl acetate was added to the residue, and the insoluble matter was removed by filtration. Butyl acetate of the filtrate was distilled off under reduced pressure to obtain a 2-ethylhexyl acrylate/n-butyl acrylate copolymer [A1] having an acryloyl group at the terminal. The number average molecular weight was 23,000, the molecular weight distribution was 1.1, and the average number of acryloyl groups introduced per polymer molecule was about 1.9 as determined by 1H-NMR analysis. In addition, the glass transition temperature (Tg) was −50° C.

Acryloyl group-terminated polyacrylate A2 (Synthetic example) Except that the acrylic monomer/radical polymerization initiator ratio was set to 80, 2-Ethylhexyl acrylate/n-butyl acrylate copolymer having an acryloyl group at the end was obtained by the same method as the acryloyl group-terminated polyacrylate [A1]. The number average molecular weight was 7,000, the molecular weight distribution was 1.1, and the average number of acryloyl groups introduced per polymer molecule was about 1.8 as determined by 1H-NMR analysis. In addition, the glass transition temperature (Tg) was −50° C.

Acryloyl group-terminated polyacrylate A3 (Synthetic example) Except that the acrylic monomer/radical polymerization initiator ratio was set to 550, 2-ethylhexyl acrylate/ n-butyl acrylate copolymer [A3] having an acryloyl group at the end was obtained by the same method as the acryloyl group-terminated polyacrylate [A1]. The number average molecular weight was 95,000, the molecular weight distribution was 1.4, and the average number of acryloyl groups introduced per polymer molecule was about 2.0 as determined by 1H-NMR analysis. In addition, the glass transition temperature (Tg) was −51° C.

Acryloyl group-terminated polyacrylate A4 (Synthetic example) With respect to the acrylic monomer, 50 weight parts/50 weight parts of acrylate ethyl/n-butyl acrylate was used, and except that the acrylic monomer/radical polymerization initiator ratio was set to 180, having an acryloyl group at the end was obtained by the same method as the acryloyl group-terminated polyacrylate [A1]. The number average molecular weight was 20,000, the molecular weight distribution was 1.2, and the average number of acryloyl groups introduced per polymer molecule was about 1.9 as determined by 1H-NMR analysis. In addition, the glass transition temperature (Tg) was −35° C.

<Component (B)>
2-ethylhexyl acrylate (Tg: −70° C., manufactured by Mitsubishi Chemical Corporation)
n-butyl acrylate (Tg: −55° C., manufactured by Mitsubishi Chemical Corporation)
n-octyl acrylate (Tg: −65° C., manufactured by Osaka Organic Chemical Industry Co., Ltd.)
Isobornyl acrylate (Tg: 97° C., manufactured by Osaka Organic Chemical Industry Co., Ltd.)

<Component (C)>
1,9-nonanediol dimethacrylate (manufactured by NOF CORPORATION)
1,9-nonanediol diacrylate (manufactured by Shin-Nakamura Chemical Industry Co., Ltd.)
Pentaerythritol acrylate (manufactured by Osaka Organic Chemical Industry Co., Ltd., Viscoat #802 [a mixture of tripentaerythritol acrylate, monopentaerythritol acrylate, dipentaerythritol acrylate, and polypentaerythritol acrylate])

<Component (D)>
2-hydroxy-2-methyl-1phenyl propane-1-one (manufactured by iGM RESINS, Omnirad1173)

<Component (E)>
Trimethylsilylated silica (manufactured by AEROSIL, AEROSIL RX200)
Methacryl silylated silica (manufactured by AEROSIL, AEROSIL R7200)

<Component (F)>
4,4'-bis(α,α-dimethylbenzyl)diphenyl amine (manufactured by Seiko Kagaku Co., Ltd., non-flex DCD)

Examples 1 to 18, Comparative Examples 1 to 10

(Producing of Radical-Curable Seal Member for Fuel Cell)

A radical-curable composition was prepared by blending each component shown in Tables 1 and 2 below in the ratio shown in the same table and kneading each component by a planetary mixer (manufactured by Inoue Seisakusho Co., Ltd.). Ultraviolet rays were irradiated by a high-pressure mercury UV irradiator (F600V-10 manufactured by Heraeus) (irradiation intensity: 250 mW/cm$^2$, integrated light intensity: 3000 mJ/cm$^2$) to obtain each test sample having a diameter of 15 mm and a thickness of 1 mm.

Each property of each test sample obtained as described above was evaluated according to the following criteria. The results are shown in Tables 1 and 2.

<High Temperature Compression Permanent Strain>
Each test sample was subjected to a compression permanent strain test at a high temperature in accordance with JIS K 6262. After being compressed at a compression rate of 25% and heated at 120° C. for 24 hours in that state, each test sample was released. A thickness of each test sample after 30 minutes at room temperature (25° C.) was measured, and the compression permanent strain (%) was calculated and evaluated according to the following criteria.
Less than 10% ⊚
10% or more and less than 20% ○
20% or more and less than 30% Δ
30% or more x <High Temperature Compression Crack>
In addition, except that the above compression rate was changed to 40%, 50%, or 60%, the test was conducted under the same conditions as the above <high temperature compression permanent strain>test, and the presence or absence of cracks in each test sample was visually confirmed.
No cracks with 60% compression ⊚
No cracks with 50% compression ○
No cracks with 40% compression Δ
Cracks with 40% compression x <Low Temperature Compression Permanent Strain>
Each test sample was subjected to a compression permanent strain test at a low temperature in accordance with JIS K 6262. After being compressed at a compression rate of 25% and allowed to stand at −30° C. for 24 hours, each test sample was released. A thickness of each test sample after 30 minutes at the same temperature was measured, and the compression permanent strain (%) was calculated and evaluated according to the following criteria.
Less than 55% ⊚
55% or more and 65% less than ○
65% or more and 75% less than Δ
75% or more x <Low Temperature Compression Crack>
In addition, except that the above compression rate was changed to 40%, 50%, or 60%, the test was conducted under the same conditions as the above <low temperature compression permanent strain>test, and the presence or absence of cracks in each test sample was visually confirmed.
No cracks with 60% compression ⊚
No cracks with 50% compression ○
No cracks with 40% compression Δ
Cracks with 40% compression x <<Comprehensive Evaluation>>
A case where all the property evaluations were "0" or "0" and the number of "0" was 3 or more was regarded as the comprehensive evaluation "⊚". In addition, a case where all the property evaluations were "0" or "⊚" and the number of "⊚" was less than three was regarded as the comprehensive evaluation "○". In addition, a case where there is even one "x" in the evaluation of each property was regarded as the comprehensive evaluation "x".

<Glass Transition Temperature>
A glass transition temperature of each test sample obtained as described above was measured by a differential scanning calorimeter (DSC) in the same manner as described above. The results are shown in Tables 1 and 2.

TABLE 1

|  |  | Example |  |  |  |  |  |  |  |  |  |  |  |  |  |  |  |  |  |
|---|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 | 17 | 18 |
| A | Acryloyl group-terminated polyacrylate A1 | 100 | 100 | 100 | 100 | 100 | 100 | 100 | 100 | 100 | — | — | 100 | 100 | 100 | 100 | 100 | 100 | 100 |
|  | Acryloyl group-terminated polyacrylate A2 | — | — | — | — | — | — | — | — | — | 100 | — | — | — | — | — | — | — | — |
|  | Acryloyl group-terminated polyacrylate A3 | — | — | — | — | — | — | — | — | — | — | 100 | — | — | — | — | — | — | — |
|  | Acryloyl group-terminated polyacrylate A4 | — | — | — | — | — | — | — | — | — | — | — | — | — | — | — | — | — | — |
| B | 2-ethylhexyl acrylate | 50 | 50 | 50 | 20 | 20 | 90 | 90 | 30 | 60 | 50 | 50 | — | — | 50 | 50 | 50 | 50 | 50 |
|  | n-butyl acrylate | — | — | — | — | — | — | — | — | — | — | — | 50 | — | — | — | — | — | — |
|  | n-octyl acrylate | — | — | — | — | — | — | — | — | — | — | — | — | 50 | — | — | — | — | — |
|  | Isobornyl acrylate | — | — | — | — | — | — | — | — | — | — | — | — | — | — | — | — | — | — |
| C | 1,9-nonanediol dimethacrylate | 2.5 | 5 | 10 | — | — | 7.5 | 10 | — | — | 5 | 5 | 5 | 5 | — | — | 5 | 5 | 5 |
|  | 1,9-nonanediol diacrylate | — | — | — | 1.5 | 3 | — | — | — | — | — | — | — | — | 5 | — | — | — | — |
|  | Pentaerythritol acrylate | — | — | — | — | — | — | — | 3 | 6 | — | — | — | — | — | 5 | — | — | — |
| D | 2-hydroxy-2-methyl-1-phenylpropan-1-one | 5 | 5 | 5 | 5 | 5 | 5 | 5 | 5 | 5 | 5 | 5 | 5 | 5 | 5 | 5 | 5 | 5 | 5 |
| E | Trimethylsilylated silica | — | — | — | — | — | — | — | — | — | — | — | — | — | — | — | 10 | — | — |
|  | Methacryl silylated silica | — | — | — | — | — | — | — | — | — | — | — | — | — | — | — | — | 10 | 30 |
| F | 4,4'-bis(α,α-dimethylbenzyl)diphenylamine | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| (B)/(C) |  | 20.0 | 10.0 | 5.0 | 13.3 | 6.7 | 12.0 | 9.0 | 10.0 | 10.0 | 10.0 | 10.0 | 10.0 | 10.0 | 10.0 | 10.0 | 10.0 | 10.0 | 10.0 |
| (C)/{(A) + (B) + (C)} |  | 1.6% | 3.2% | 6.3% | 1.2% | 2.4% | 3.8% | 5.0% | 2.3% | 3.6% | 3.2% | 3.2% | 3.2% | 3.2% | 3.2% | 3.2% | 3.2% | 3.2% | 3.2% |
| High temperature compression permanent strain |  | ○ | ◎ | ○ | ○ | ◎ | ◎ | ○ | ◎ | ◎ | ◎ | ◎ | ◎ | ◎ | ◎ | ◎ | ◎ | ◎ | ◎ |
| High temperature compression crack |  | ◎ | ◎ | ◎ | ○ | ○ | ◎ | ◎ | ◎ | ◎ | ○ | ◎ | ◎ | ○ | ◎ | ◎ | ○ | ◎ | ◎ |
| Low temperature compression permanent strain |  | ◎ | ◎ | ○ | ○ | ◎ | ◎ | ◎ | ◎ | ◎ | ◎ | ◎ | ◎ | ◎ | ◎ | ◎ | ◎ | ◎ | ◎ |
| Low temperature compression crack |  | ◎ | ◎ | ○ | ○ | ○ | ○ | ○ | ◎ | ◎ | ○ | ○ | ○ | ○ | ○ | ○ | ○ | ◎ | ◎ |
| Glass transition temperature (Tg) |  | −46 | −46 | −45 | −46 | −45 | −45 | −47 | −47 | −46 | −46 | −47 | −45 | −46 | −46 | −48 | −46 | −46 | −46 |
| Comprehensive evaluation |  | ○ | ◎ | ○ | ○ | ○ | ○ | ○ | ◎ | ◎ | ○ | ○ | ○ | ○ | ○ | ○ | ○ | ◎ | ◎ |

(Weight part)

TABLE 2

(Weight part)

| | | Comparative example | | | | | | | | | |
|---|---|---|---|---|---|---|---|---|---|---|---|
| | | 1 | 2 | 3 | 4 | 5 | 6 | 7 | 8 | 9 | 10 |
| A | Acryloyl group-terminated polyacrylate A1 | 100 | 100 | 100 | 100 | 100 | 100 | 100 | 100 | 100 | — |
| | Acryloyl group-terminated polyacrylate A2 | — | — | — | — | — | — | — | — | — | — |
| | Acryloyl group-terminated polyacrylate A3 | — | — | — | — | — | — | — | — | — | — |
| | Acryloyl group-terminated polyacrylate A4 | — | — | — | — | — | — | — | — | — | 100 |
| B | 2-ethylhexyl acrylate | 50 | 50 | 15 | 100 | 90 | 20 | 50 | — | — | 50 |
| | n-butyl acrylate | — | — | — | — | — | — | — | — | — | — |
| | n-octyl acrylate | — | — | — | — | — | — | — | — | — | — |
| | Isobornyl acrylate | — | — | — | — | — | — | — | — | 50 | — |
| C | 1,9-nonanediol dimethacrylate | 1 | 12 | 5 | 5 | 2 | 10 | — | 5 | 5 | 5 |
| | 1,9-nonanediol diacrylate | — | — | — | — | — | — | — | — | — | — |
| | Pentaerythritol acrylate | — | — | — | — | — | — | — | — | — | — |
| D | 2-hydroxy-2-methyl-1phenylpropan-1-one | 5 | 5 | 5 | 5 | 5 | 5 | 5 | 5 | 5 | 5 |
| E | Trimethylsilylated silica | — | — | — | — | — | — | — | — | — | — |
| | Methacryl silylated silica | — | — | — | — | — | — | — | — | — | — |
| F | 4,4'-bis(α,α-dimethylbenzyl) diphenylamine | 1.5 | 1.5 | 1.5 | 1.5 | 1.5 | 1.5 | 1.5 | 1.5 | 1.5 | 1.5 |
| (B)/(C) | | 50.0 | 4.2 | 3.0 | 20.0 | 45.0 | 2.0 | — | — | 10.0 | 10.0 |
| (C)/{(A) + (B) + (C)} | | 0.7% | 7.4% | 4.2% | 2.4% | 1.0% | 7.7% | — | — | 3.2% | 3.2% |
| High temperature compression permanent strain | | X | ◎ | ◎ | X | X | ◎ | X | ◎ | Δ | ◎ |
| High temperature compression crack | | ◎ | X | X | ◎ | ◎ | X | ○ | X | ◎ | ◎ |
| Low temperature compression permanent strain | | X | ◎ | ◎ | X | X | ◎ | X | ◎ | X | X |
| Low temperature compression crack | | ◎ | X | X | ◎ | ◎ | X | ○ | X | Δ | ○ |
| Glass transition temperature (Tg) | | −46 | −45 | −45 | −47 | −47 | −45 | −49 | −45 | 20 | −28 |
| Comprehensive evaluation | | X | X | X | X | X | X | X | X | X | X |

From the results in Table 1 above, it can be seen that, for the seal members of Examples 1 to 18 satisfying the respective requirements of the present disclosure, excellent results are obtained in each evaluation of the compression permanent strain resistance and the compression cracking property at high temperature and the compression permanent strain resistance and the compression cracking property at low temperature.

In contrast, from the results in Table 2 above, because the seal member of Comparative example 1 has the values of [(B)/(C)] and [(C)/{(A)+(B)+(C)}] outside the range of the present disclosure, an inferior result was obtained in the evaluation of the compression permanent strain resistance at high temperature and low temperature.

In addition, because the seal member of Comparative example 2 has a large content of the component (C) and the value of [(C)/{(A)+(B)+(C)}] outside the range of the present disclosure, an inferior result was obtained in the evaluation of the compression cracking property at high temperature and low temperature.

In addition, because the seal member of Comparative example 3 has a small content of the component (B) and the value of [(B)/(C)] outside the range of the present disclosure, an inferior result was obtained in the evaluation of the compression cracking property at high temperature and low temperature.

In addition, because the seal member of Comparative example 4 has a large content of the component (B), an inferior result was obtained in the evaluation of the compression permanent strain resistance at high temperature and low temperature.

In addition, because the seal member of Comparative example 5 has the value of [(B)/(C)] outside the range of the present disclosure, an inferior result was obtained in the evaluation of the compression permanent strain resistance at high temperature and low temperature.

In addition, because the seal member of Comparative example 6 has the values of [(B)/(C)] and [(C)/{(A)+(B)+(C)}] outside the range of the present disclosure, an inferior result was obtained in the evaluation of the compression cracking property at high temperature and low temperature.

In addition, because the seal member of Comparative example 7 does not contain the component (C), an inferior result was obtained in the evaluation of the compression permanent strain resistance at high temperature and low temperature.

In addition, because the seal member of Comparative example 8 does not contain the component (B), an inferior result was obtained in the evaluation of the compression cracking property at high temperature and low temperature.

In addition, because the seal members of Comparative examples 9 and 10 have the glass transition temperatures (Tg) outside the range of the present disclosure, an inferior result was obtained in the evaluation of the compression permanent strain resistance or the like at low temperature.

Although specific embodiments of the present disclosure have been shown in the above examples, the above examples are merely examples and are not to be interpreted in a limited manner. Various variations apparent to those skilled in the art are intended to be within the scope of the present disclosure.

INDUSTRIAL APPLICABILITY

The seal member of the present disclosure is used for a member constituting a fuel cell, for example, a rubber seal member of a fuel cell seal body which is made in a manner that a component for fuel cell such as a metal separator or the like and the seal member for sealing the component for fuel cell are adhered to each other via an adhesion layer, or a fuel cell seal body which is made in manner that the seal members are adhered to each other via an adhesion layer.

What is claimed is:

1. A radical-curable seal member for fuel cell, comprising a crosslinked product of a radical-curable composition and having a glass transition temperature (Tg) of −40° C. or lower, wherein the radical-curable composition comprises:
   (A) (Meth)acrylic polymer having a (meth)acryloyl group at a molecular chain end, (B) Monofunctional (meth)acrylic monomer,
(C) Polyfunctional (meth)acrylic monomer, and
(D) Radical polymerization initiator,
wherein the radical-curable composition contains 20 to 90 weight parts of the component (B), 1 to 10 weight parts of the component (C), and 0.01 to 10 weight parts of the component (D) with respect to 100 weight parts of the component (A), and
a weight ratio [(B)/(C)] of the component (B) with respect to the component (C) is 4 to 24, and a content [(C)/{(A)+(B)+(C)}] of the component (C) with respect to a total of 100 wt % of the component (A), the component (B), and the component (C) is 1 to 7 wt %.

2. The radical-curable seal member for fuel cell according to claim 1, wherein a glass transition temperature (Tg) of the component (B) is −40° C. or lower.

3. The radical-curable seal member for fuel cell according to claim 1, wherein the component (B) is at least one selected from a group consisting of 2-ethylhexyl acrylate, n-butyl acrylate, nonyl acrylate, isodecyl acrylate, and n-octyl acrylate.

4. The radical-curable seal member for fuel cell according to claim 1, wherein a number average molecular weight (Mn) of the component (A) is 5,000 to 100,000.

5. The radical-curable seal member for fuel cell according to claim 1, wherein the component (A) is a copolymer composed of an acrylic acid ester monomer having an ester group having 2 to 14 carbon atoms, or a copolymer composed of a methacrylic acid ester monomer having an ester group having 8 to 14 carbon atoms.

6. The radical-curable seal member for fuel cell according to claim 1, wherein the component (A) is a copolymer composed of n-butyl acrylate and 2-ethylhexyl acrylate.

7. The radical-curable seal member for fuel cell according to claim 6, wherein a copolymerization ratio of the copolymer (n-butyl acrylate:2-ethylhexyl acrylate) is 40 to 60:60 to 40.

8. The radical-curable seal member for fuel cell according to claim 1, wherein the component (C) is at least one selected from a group consisting of 1,6-hexanediol di(meth)acrylate, 1,9-nonanediol di(meth)acrylate and pentaerythritol acrylate-based compounds.

9. The radical-curable seal member for fuel cell according to claim 1, further comprising silica.

10. The radical-curable seal member for fuel cell according to claim 9, wherein the silica is at least one selected from a group consisting of dimethylsilylated silica, trimethylsilylated silica, octylsilylated silica, and methacrylsilylated silica.

11. The radical-curable seal member for fuel cell according to claim 1, wherein the radical-curable composition is an ultraviolet curable composition.

12. The radical-curable seal member for fuel cell according to claim 1, wherein the radical-curable seal member for fuel cell is a film-like seal member.

13. The radical-curable seal member for fuel cell according to claim 12, wherein a thickness of the film-like seal member is 50 to 1,000 μm.

* * * * *